UNITED STATES PATENT OFFICE.

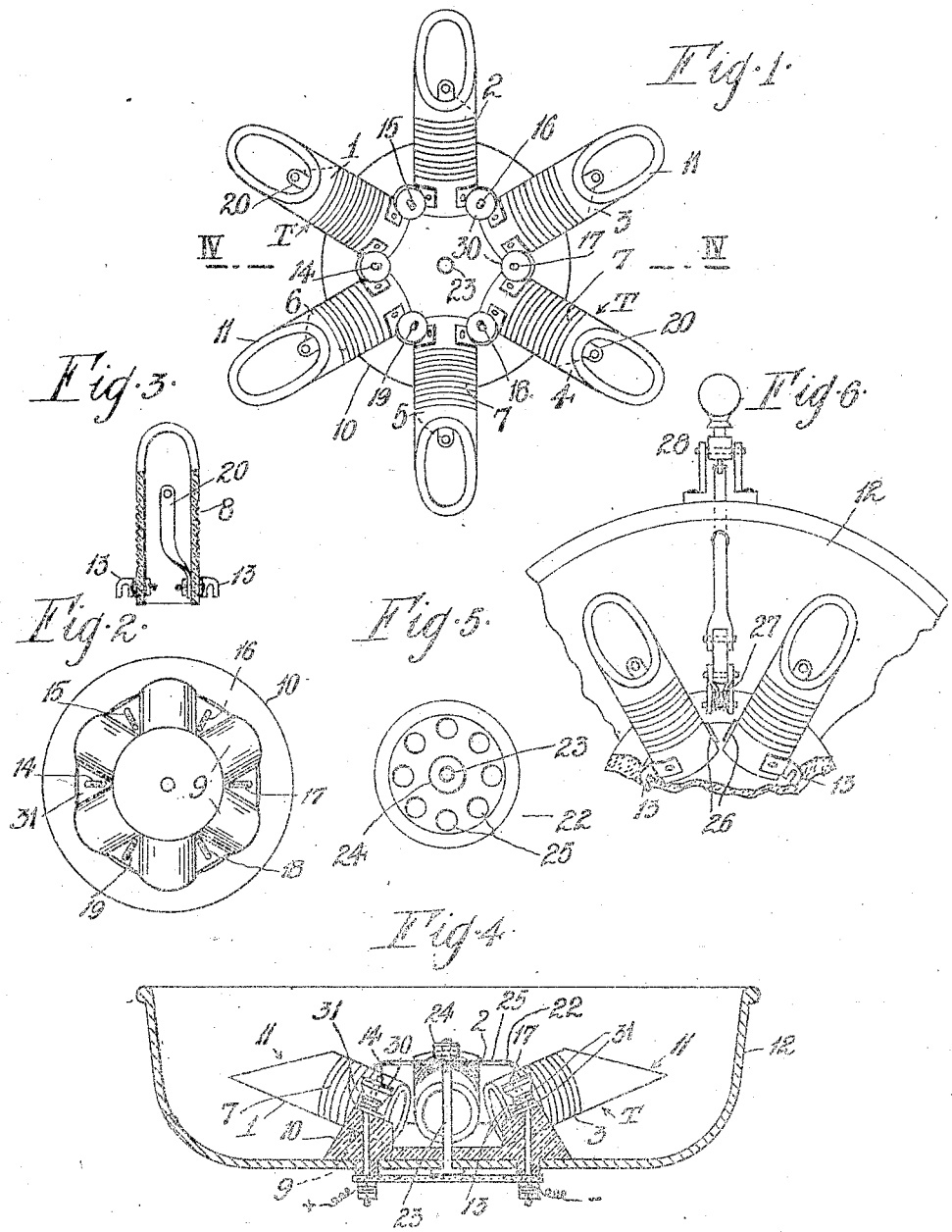

LESLIE VICTOR LEONARD, OF RICHMOND, VICTORIA, AUSTRALIA, ASSIGNOR OF ONE-HALF TO ALFRED JAMES ALLEN, OF MOONEE PONDS, VICTORIA, AUSTRALIA.

ELECTRIC HEATER UNIT.

1,278,484.

Specification of Letters Patent.   Patented Sept. 10, 1918.

Application filed December 8, 1917.   Serial No. 205,186.

*To all whom it may concern:*

Be it known that I, LESLIE VICTOR LEONARD, a subject of the King of Great Britain, residing at 619 Bridge road, Richmond, in the State of Victoria, Commonwealth of Australia, electrical engineer, have invented certain new and useful Improvements in Electric Heater Units, of which the following is a specification.

This invention consists of improvements in electric heat units, applicable to radiators, heating stoves, cooking stoves, cooking utensils, kettles and for heating purposes generally. The object of the invention is to provide a simply wired and inexpensive electric heat unit, so constructed and arranged that the maximum heat energy generated is concentrated and given off in the direction required. That is to say the members of the improved unit are so arranged that the radiant and reflected as well as the convective heat is concentrated and given off in one direction.

A further advantage of the invention is the facility with which burnt out sections of the unit may be expeditiously removed and replaced by new sections and furthermore a maximum and exceedingly effective heating surface is obtained by this invention.

Briefly stated the unit comprises a series of open ended tubes of porcelain, fused silica or like heat resisting insulating material, arranged in radial relationship and having their outer ends approximately at right angles to the axial line of the unit, *i. e.* facing upward unless the unit is used as a cooker or outwardly when used as a radiator. The tubes are preferably set at an inclination to the base of said unit and are formed exteriorly with spiral grooves in which are wound high resistance wires, said tubes being connected in series or parallel and provided if required with suitable switches for regulating the heat energy. The tubes are so connected up by contact clips that a defective one may be instantly removed and a perfect one substituted and the unit is provided with a parabolic or other suitable reflector.

The invention is illustrated in the accompanying drawings by one practical form of the unit, said drawings comprising—

Figure 1 a plan of the tubes fitted to a central base;

Fig. 2 a plan of the base;

Fig. 3 a longitudinal section through one tube;

Fig. 4 a cross section through the unit on line IV—IV of Fig. 1; and showing also the reflector;

Fig. 5 a plan of a central cover; and

Fig. 6 a partial plan view illustrating a tumbler switch for regulating the heat energy.

Referring to these drawings it will be seen that each tube T is wound with a resistance wire 7 seated in a spiral groove 8 formed in the exterior of said tube. The inner ends of the tubes are seated in radially disposed inclined sockets 9 formed in a porcelain or like insulating central base or hub 10 and the outer ends 11 of said inclined radiating tubes are splayed so that their outer apertures are approximately at right angles to the axial line of said base. With this latter construction the internal heat of the tubes is given off in the same direction as the external or radiant heat and when the unit is backed by a suitable parabolic or a dished reflector such as 12, reflected heat is also given off in like direction. It will be evident that a somewhat similar effect would be obtained by setting the radiating tubes straight and shaping the ends so that the outer apertures are approximately at right angles to the axial line of the unit.

According to the construction illustrated the tubes are independently secured in position by means of slotted clips 13 which engage the shanks of the terminal studs 14, 15, 16, 17, 18, 19 and are clamped by nuts 30 between washers 31.

The positive lead is connected for instance to the terminal 14 and current passes through one clip 13 on tube 1 to resistance wire wound around same which is attached to an internal contact strip 20 connected with the other clip clamped on the next terminal 15. Similarly the circuit passes through the wires around the other tubes 2, 3, and terminals 16—17 which latter is connected with the negative lead. The tubes 6, 5, 4 with their terminals 19, 18 are similarly connected to terminals 14 and 17.

The clips 13 of adjacent tubes are clamped on the terminals by means of the nuts 30 and in order to remove a tube it is only necessary to slacken the nuts of the terminals on either side of the particular defective tube when the latter may be withdrawn from its socket in the base.

A cover 22 Fig. 5 which protects the terminals is fitted on a stud 23 projecting up from the center of the base and is secured by a nut 24.

A suitable number of holes 25 formed in said cover 22 allow a free passage of air through the tubes which air becomes heated by contact with the hot internal surface of the tubes.

Various types of switches may be used for cutting out any desired number of tubes and so regulating the heat energy. In the illustration given there are two series, viz.— tubes 1, 2, 3 and 4, 5, 6, and one or other of the series may be cut out by introducing a switch in place of one of the intermediate terminals.

A tumbler switch may be used for the purpose as illustrated in Fig. 6 and in this case female contacts 26 are used in lieu of the slotted clips 13 and the male contacts 27 are operated by the tumbler 28 to make or break contact and thus employ the full heat energy or only half of same.

I claim—

1. An improved electric heat unit consisting of a series of heat resisting tubes extending radially from a central insulating base the ends of which tubes are approximately parallel to the axial line of said base, said tubes being formed exteriorly with spiral grooves in which are embedded high resistance wires.

2. An electric heat unit as set forth in claim 1 and in which the tubes are set at an inclination and their ends are splayed so as to be approximately parallel to the axial line of the unit.

3. An electric heat unit as set forth in claim 1 and in which the ends of the radially arranged tubes are turned so that their apertures are approximately parallel to the axial line of the unit.

4. An electric heat unit as set forth in claim 1 and in which the tubes are independently seated in inclined sockets formed in the base and detachably clipped to terminal studs thereon.

5. An electric heat unit as set forth in claim 1 and in which the tubes are independently attached to the base by clip means constituting conductors in the circuit.

6. An electric heat unit as set forth in claim 4 and in which the tubes are provided with slotted clips which engage the terminal studs and are secured by clamping nuts on the latter said clips constituting conductors in the circuit.

7. An electric heat unit as set forth in claim 5 and in which each tube is provided with a clip on each side one being connected with an internal contact strip to which one end of the resistance wire is attached.

8. An electric heating unit as set forth in claim 5, in which the slotted clips on one pair of adjacent tubes are replaced by contact studs and a movable switch member is provided for coöperating with said contact studs for regulating the heat energy, substantially as described.

9. An electric heat unit as set forth in claim 1 and in which the tubes are clipped to terminal studs and the base is provided with a central stud upon which is secured a cover to protect the terminal studs.

LESLIE VICTOR LEONARD.